United States Patent
Mark

(10) Patent No.: US 6,709,621 B2
(45) Date of Patent: Mar. 23, 2004

(54) BRISTLES OF AN APPLICATOR PRODUCED IN A LASER MILLED MOLD

(76) Inventor: Phillip E. Mark, 1255 LaQuinta Dr., Orlando, FL (US) 32809

( * ) Notice: Subject to any disclaimer, the term of this patent is extended or adjusted under 35 U.S.C. 154(b) by 287 days.

(21) Appl. No.: 10/020,250

(22) Filed: Dec. 18, 2001

(65) Prior Publication Data

US 2002/0041053 A1 Apr. 11, 2002

Related U.S. Application Data

(63) Continuation-in-part of application No. 09/395,959, filed on Sep. 14, 1999, now abandoned.

(51) Int. Cl.[7] .......................... B23K 26/00; B29C 45/00
(52) U.S. Cl. ........................ 264/400; 264/138; 264/219; 264/243; 264/323.1; 264/482; 219/121.71
(58) Field of Search ................................ 264/219, 138, 264/139, 400, 243, 328.1, 328.8, 328.12, 482; 425/805; 219/121.7, 121.71

(56) References Cited

U.S. PATENT DOCUMENTS

| | | | | | |
|---|---|---|---|---|---|
| 2,651,810 | A | * | 9/1953 | Snyder | 264/519 |
| 2,859,478 | A | * | 11/1958 | Glasson | 425/408 |
| 3,781,402 | A | * | 12/1973 | Hanggi et al. | 264/243 |
| 5,765,573 | A | * | 6/1998 | Gueret | 132/218 |
| 5,792,411 | A | * | 8/1998 | Morris et al. | 264/400 |

FOREIGN PATENT DOCUMENTS

WO WO 94/13461 * 6/1994

* cited by examiner

Primary Examiner—Stefan Staicovici
(74) Attorney, Agent, or Firm—Eric R. Schellin

(57) ABSTRACT

A method for injection molding a plastic applicator with a ball of bristles produced integrally with a support handle. The mold consists of two opposing parts. The mold is machined by means of a laser. The mold is laser drilled with gradually decreasing depths of bores from the midpoint of the mold parts outwardly.

1 Claim, 4 Drawing Sheets

BRISTLES OF AN APPLICATOR PRODUCED IN A LASER MILLED MOLD

This application is a continuation-in-part of patent application Ser. No. 09/395,959, filed Sep. 14, 1999 now abandoned.

FIELD OF THE INVENTION

The invention relates to molding or replication tooling. In particular, the invention relates to laser machined mold or replication tooling useful for the ultimate production of structured articles, such as bristles of a liquid applicator.

BACKGROUND OF THE INVENTION

Molding or replicating tooling has been produced by several different techniques. These techniques include, for instance, machining and chemical processing. Machining is accomplished by cutting with a stylus or microfilming into a substance, such as a mold surface.

Devices which accomplish such machining are either manually, mechanically or electronically controlled. These devices are capable of producing surfaces with optical grade precision, depending upon their quality. U.S. Pat. No. 4,938,563 to Nelson et al discloses the use of a diamond stylus for cutting into a flat metal surface of a master tool or mold. U.S. Pat. No. 4,959,265 to Wood et al. discloses the use of a microdrill to form the mold for a pressure-sensitive adhesive tape fastener backing. U.S. Pat. No. 5,077,870 to Melby et al relates to the use of a microdrill to form a metal mold used to produce mushroom-type hook strips for a mechanical fastener. These methods are considered slow for all but the simplest replications. In addition, replacement of the stylus and drill bits is expensive and adds to the cost of the machining. Another method for the production of microstructured tooling relates to the use of sharpened or shaped structures, such as pins or rods, being forced into a relatively soft medium, such as described in U.S. Pat. No. 3,235,438 to Wisotzky. This patent also illustrates the traditional, multi-step approach to the production of a microreplication molding or tooling. A primary negative mold is prepared by forcing the structures into the relatively soft medium. Intermediate positive master molds are made from the negative primary mold and are then joined together to form a large positive mold. A large negative mold is then produced from the large positive mold, which is then used to produce replicated articles. Preparation of the final negative mold requires significant time and cost.

Lasers have been used to machine some finished articles, such as filters, award plaques, rubber stamps, and stencils, but lasers have not been used to make molds or replication toolings. U.S. Pat. No. 5,792,411 to Morris et al calls for laser use to cut cavities is a substrate for producing tooling which can be used for microreplication purpose.

Such toolings has not been shown to be used to produce a true mold into which a thermoplastic resin is injected in order to produce an elongated handle having a bristle portion, the latter acts as a liquid carrier.

SUMMARY OF THE INVENTION

This invention relates to a method of manufacturing a microreplication master tooling suitable for manufacturing replicated articles by machining a substrate surface with a laser light source to produce a plurality of laser drilled indentations on surface extending from the substrate surface into the substrate itself.

The invention also relates to a method of manufacturing a microreplication master tooling suitable for manufacturing replicated articles by machining a unitary substrate surface to produce at least one geometric structure having side surfaces extending into the substrate, such that the substrate provides structural means for producing articles replicated from the master tooling. The substrate may comprise two mating surfaces forming a mold into which an injectable thermoplastic material may be charged.

The invention also relates to a method of manufacturing an article such as a bristle containing member from a microreplication master tooling by machining tooling mold surfaces with a laser light source to produce a geometric structure in the mold surfaces. The mold is closed and a heated thermoplastic material is then applied into the mold through an entrance orifice. The thermoplastic is permitted to solidify to produce a replicated article of the tooling which may be a tiny bristled liquid applicator, and the thereby produced applicator is removed from the tooling or mold.

The invention further relates to an article, which is a bristles applicator that is manufactured by the method.

DETAILED DESCRIPTION OF THE INVENTION

Figure 1:
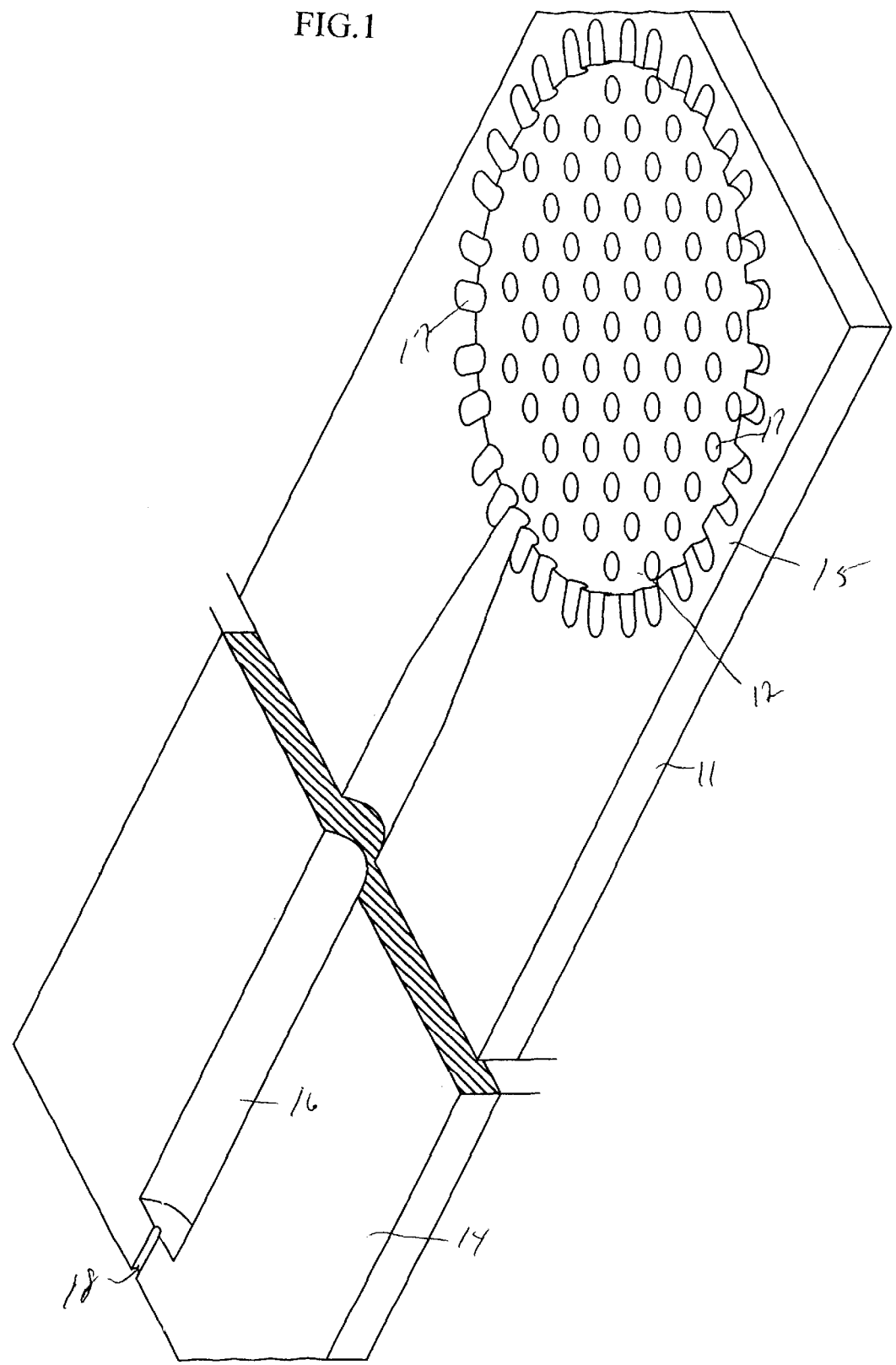
FIG. 1 is a perspective view of the open mold with a plurality of indentations.

Attention is directed to FIG. 1 which shows, generally, one part of a mold 11. The mold is shown as a single producing item but in practice is part of a large array whereby a plurality of applicators may be molded at essentially the same time.

The mold has a proximal end portion 14 and a distal end portion 15. The proximal end portion 14 has a linear elongated groove 16. The groove 16 extends to the distal end portion 15.

The distal end portion 15 has a plurality of cylindrical depressions 17 of varying, preselected depths which have been cut thereinto by a laser light in mold depression 12 as explained more fully in FIGS. 2, 3, 4 and 5. The groove 16 proximal end portion terminates in an entrance conduit 18 through which moldable material is injected when the mold is closed.

The mold 11 has a confronting part, not shown by FIG. 1 which is a mirror image of mold 11 and overlies it to complete the mold into which moldable material is injected which is a thermoplastic resinous material such as nylon, propylene or polyethylene.

FIGS. 2–5, depict the fabrication of the mold by laser light technology.

The Figures depict a cross-sectional view of distal end portion 15 of the mold.

Figure 2:
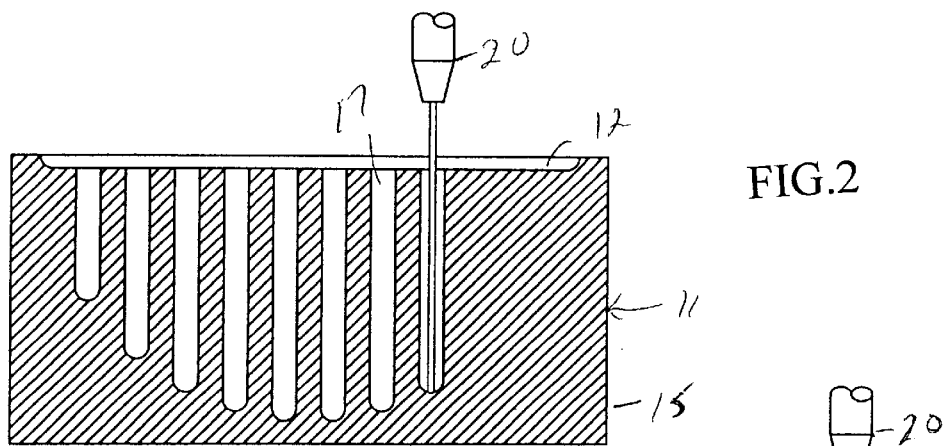
FIG. 2 is a schematic cross-section of the mold being machined by a laser beam.
Figure 3:
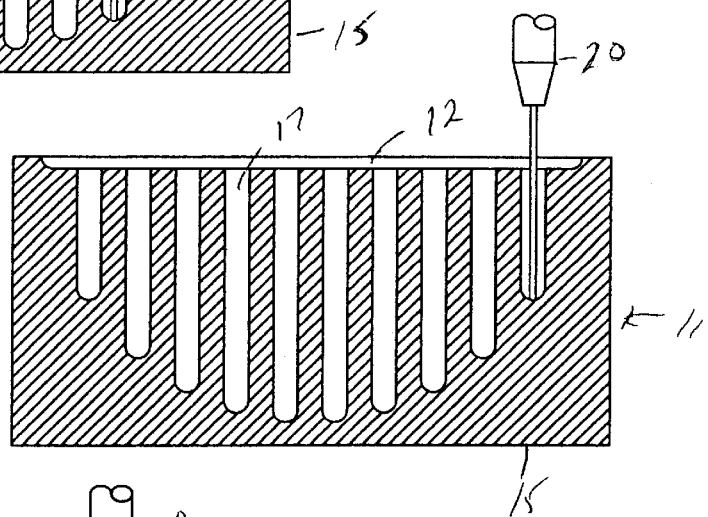
FIG. 3 is the same cross-sectional view as FIG. 2 wherein the said mold is further along in being machined.
Figure 4:
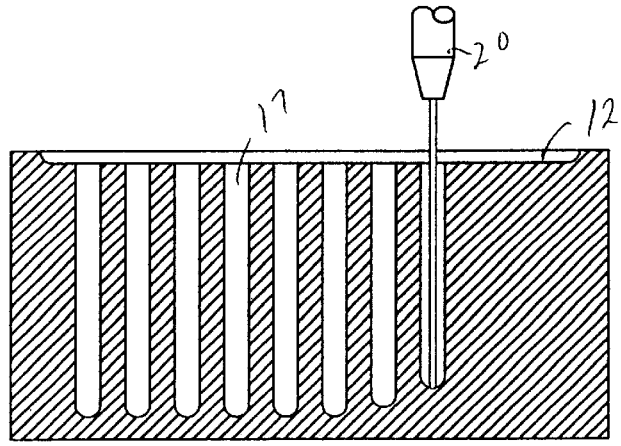
FIG. 4 is another embodiment showing laser machining of geometries of the same depth.

A laser light source 20 is shown as the machining tool, i.e., the drill means for drilling cylindrical depressions 17 to various predetermined depths. In FIG. 2 one can see that the depressions 17 are of less depth towards one side then progress to a lesser depth as the depressions on the opposite side.

Figure 5:
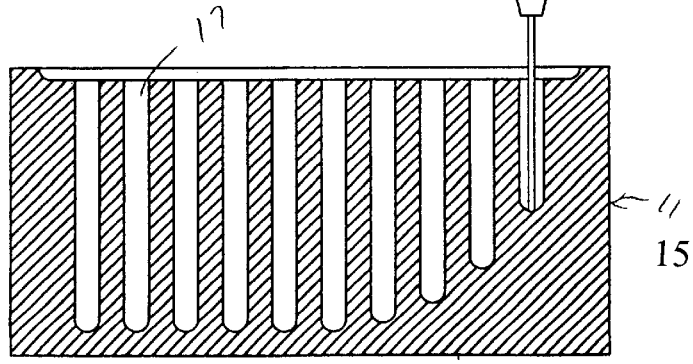
FIG. 5 is another embodiment of FIG. 4 showing machining with a laser of less shallow geometric shapes.

In FIG. 5 the depressions 17 may be of a maximum depth at one side and then be of a lesser depth on the other side.

The drilling, by the laser may be step-wise progressive or, it is contemplated that an array of laser light sources can be used to drill a great number of bores or depressions at one time.

The depressions depict a disc-like concavity. The drilled bores vary in depth progressively in a gradual decreasing progression from the midpoint of the disc concavity outwardly.

Furthermore, a great number of the molds can be produced at the same time or progressively so that a plurality of applicators may be produced simultaneously to thereby increase efficiency of operation.

While it is contemplated that the mold would be fabricated of a metal, various thermosetting plastic materials can be used as they lend themselves to relatively easy laser drilling.

Figure 6:
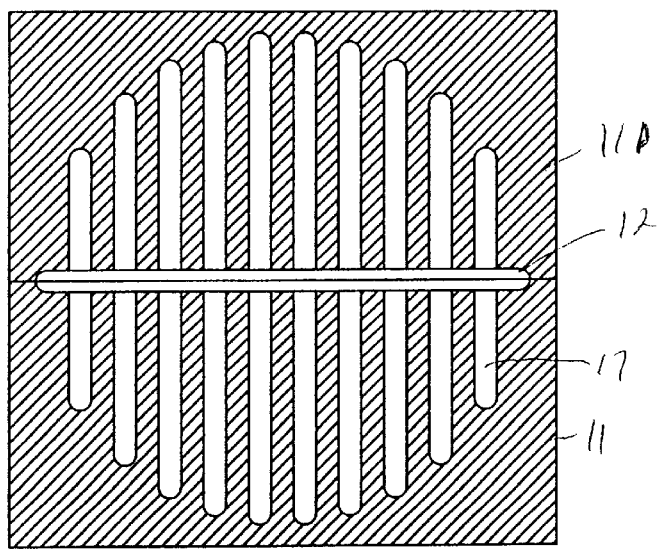
FIG. 6 depicts a cross-section of the mold laser machined with varying depths.
Figure 7:
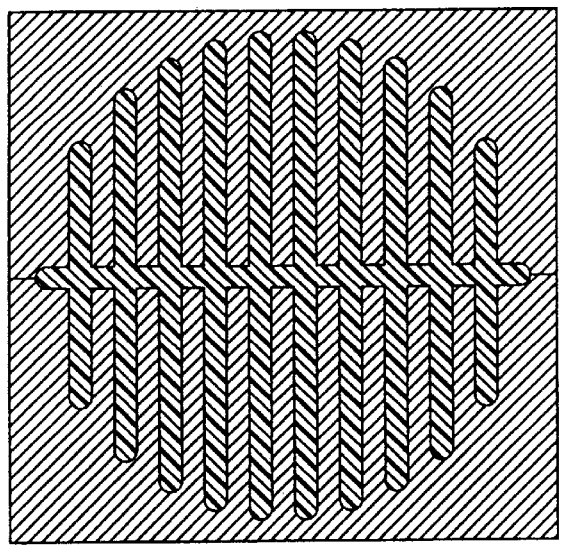
FIG. 7 is the same cross-sectional view of FIG. 6 loaded with a thermoplastic material.

FIGS. 6 and 7 depict a cross-sectional view of mold 11 which is depicted as overlain with a minor image mold portion 11A to complete the mold prior to injection with the thermoplastic material. The cross-sectional parts shown by FIGS. 6 and 7 is through distal end portion 15. As stated, FIG. 6 shows the mold in an empty condition, while FIG. 7 shows the mold loaded with a thermoplastic material.

Figure 8:
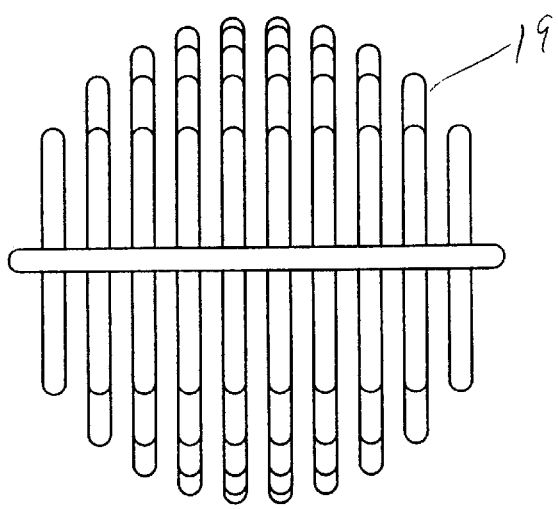
FIG. 8 depicts the solidified thermoplastic material removed from the mold.

After injection the thermoplastic material is permitted to cool in order to solidify the material. Then, from FIG. 8 one can see the molded material as it looks upon its removal from the mold, i.e., having a plurality of bristles 19 on an elongated linear handle.

Figure 9:
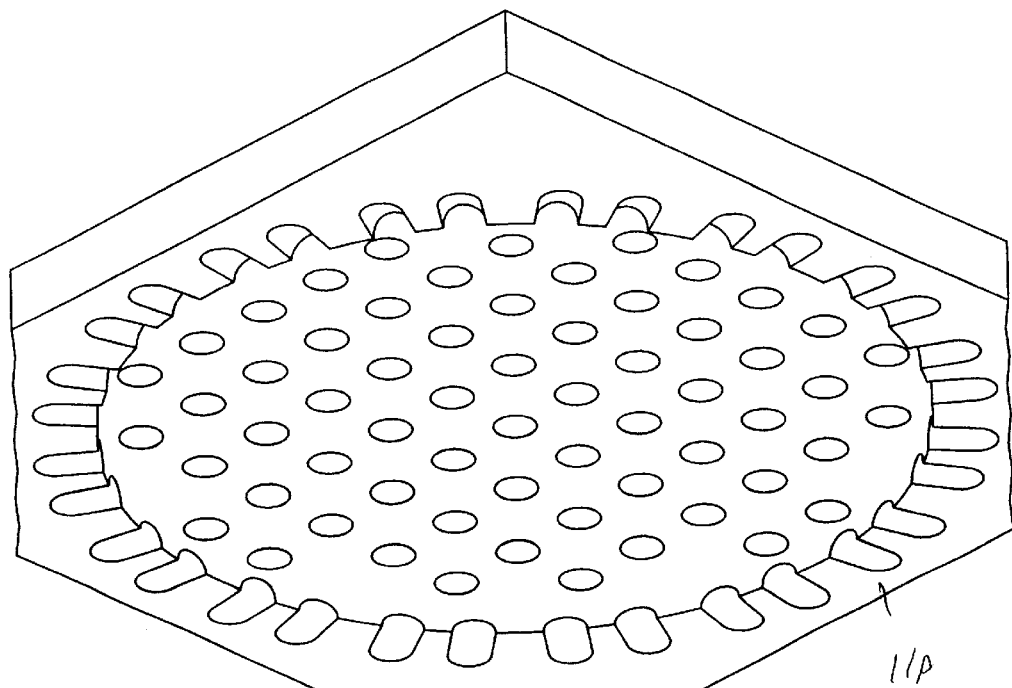
FIG. 9 depicts the mold of the present invention as it appears prior to closing.
Figure 9:
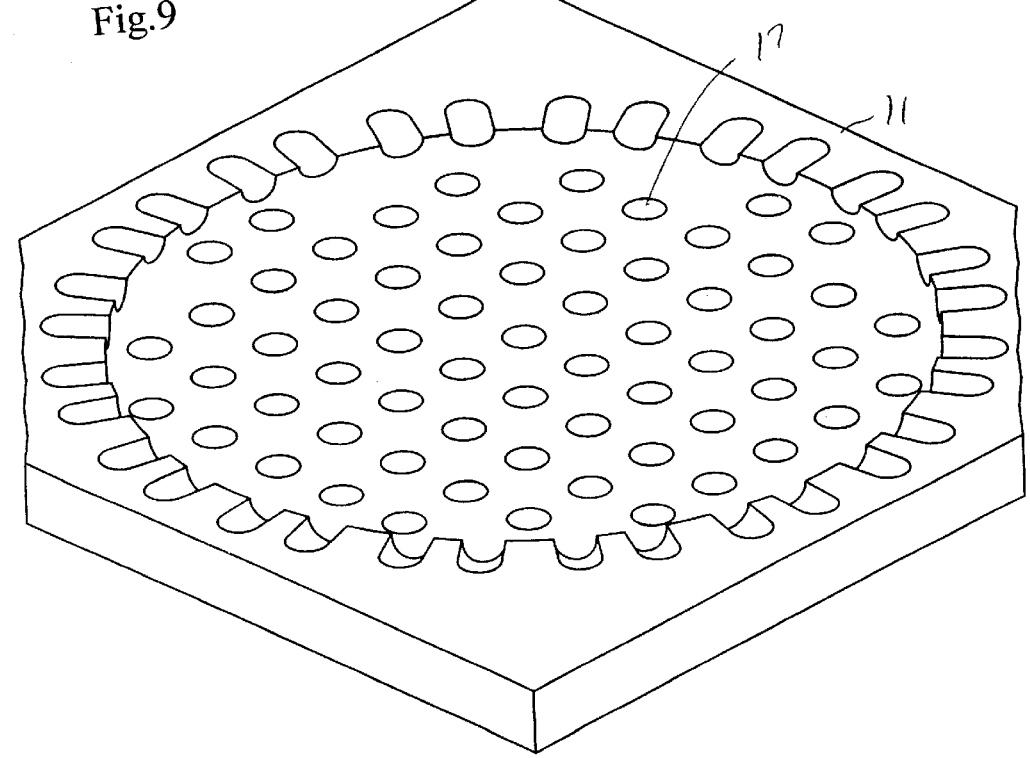

FIG. 9 depicts the mold 11 with an upper mirror image 11A thereabove. The two parts of the mold may be hinged together or may be completely separable.

The applicators resulting from the present method are generally, tiny, having, a thin handle of three to 6 inches and a bristle portion describing a ball or cylindrical configuration. Prior art applicators of this type are constructed by applying bristles to an end of a plastic stick employing various adhesives or heating the ends of the stitches to a semi-fluid condition upon which the bristles are deposited and adhered under the aegis of electrostatic attraction.

The present method accomplishes the production of an entirely integral unit of similar material both for the stick or handle and the bristles.

Laser machining of microreplication tooling is advantageous in that the molds may be produced at a high speed at a significantly reduced cost. In addition, pattern flexibility is achieved since a wide variety of geometric structures may be machined into the microreplication tooling or mold. By using a laser to machine a mold of thermosetting material, for instance, provides profile flexibility in the geometric structures. Vaporization of the resin by laser light removes the material from the machined cavity producing a minimum flash residue, which is easily cleaned and removed.

What is claimed is:

1. A method for integrally producing a tiny thermoplastic applicator having a plurality of bristles on an elongated member comprising:

providing a mold consisting of two elongated parts, each of said mold parts having a proximate end portion and a distal end portion, milling an elongated groove from said proximate end portion of each part and terminating at substantially said distal portion of each of said mold parts, milling a disc concavity in said distal portion of each of said mold parts, drilling a plurality of spaced bores with coherent light into each of said disc concavities of each mold part, said bores being of gradually decreasing depth from a midpoint of each disc concavity outwardly, closing said mold parts whereby the disc concavities of the distal portions containing said bores are in confronting relationship with one another, providing an entrance into said closed mold in said proximate end portion of a mold part, injecting a moldable material into said entrance of said closed mold to fill said mold and said bores, permitting said moldable material to solidify and form said tiny thermoplastic applicator, opening said mold, thereafter, freeing said tiny thermoplastic applicator from said mold parts.

* * * * *